(12) United States Patent
Shimoda

(10) Patent No.: US 9,363,406 B2
(45) Date of Patent: Jun. 7, 2016

(54) ILLUMINATION APPARATUS AND PAPER SHEET DISTINGUISHING APPARATUS

(71) Applicant: CANON COMPONENTS, INC., Kodama-gun, Saitama (JP)

(72) Inventor: Shuuichi Shimoda, Saitama (JP)

(73) Assignee: CANON COMPONENTS, INC., Kodama-Gun (JP)

( * ) Notice: Subject to any disclaimer, the term of this patent is extended or adjusted under 35 U.S.C. 154(b) by 0 days.

(21) Appl. No.: 14/589,477

(22) Filed: Jan. 5, 2015

(65) Prior Publication Data

US 2015/0256703 A1    Sep. 10, 2015

(30) Foreign Application Priority Data

Mar. 7, 2014  (JP) .................................. 2014-045423

(51) Int. Cl.
*H04N 1/04* (2006.01)
*H04N 1/028* (2006.01)

(52) U.S. Cl.
CPC ......... *H04N 1/02855* (2013.01); *H04N 1/0286* (2013.01); *H04N 1/02865* (2013.01)

(58) Field of Classification Search
CPC .......... H04N 1/02855; H04N 1/02865; H04N 1/0286
USPC .................................. 358/484, 475, 498, 497
See application file for complete search history.

(56) References Cited

U.S. PATENT DOCUMENTS

| | | | | |
|---|---|---|---|---|
| 5,671,306 A | * | 9/1997 | York | G02B 6/001 362/558 |
| 6,229,137 B1 | * | 5/2001 | Bohn | H04N 1/02815 250/216 |
| 7,796,310 B2 | | 9/2010 | Hasegawa et al. | |
| 8,483,472 B2 | * | 7/2013 | Manabe | G07D 7/002 340/5.86 |
| 2005/0140937 A1 | * | 6/2005 | Kumai | H04N 9/3111 353/87 |
| 2009/0109500 A1 | | 4/2009 | Hasegawa et al. | |
| 2013/0265617 A1 | * | 10/2013 | Murakami | G02B 6/0001 358/448 |

FOREIGN PATENT DOCUMENTS

| | | | | |
|---|---|---|---|---|
| JP | 1999-317854 | * | 11/1999 | ............... H04N 1/04 |
| JP | 2009135914 A | | 6/2009 | |

* cited by examiner

*Primary Examiner* — Houshang Safaipour
(74) *Attorney, Agent, or Firm* — Rossi, Kimms & McDowell LLP

(57) ABSTRACT

Provided is a light source unit that emits linear light to an original, the light source unit including: light sources that emit light; a light guide that is formed in a rod shape and that guides the light from the light sources to the original; a frame that houses the light sources and the light guide; and a circuit board including a conduction portion electrically connected to the light sources, wherein the circuit board is provided with a slit in a longitudinal direction of the light guide, the slit is disposed closer to the original than the light guide, and the light from the light guide is emitted to the original through the slit.

12 Claims, 8 Drawing Sheets

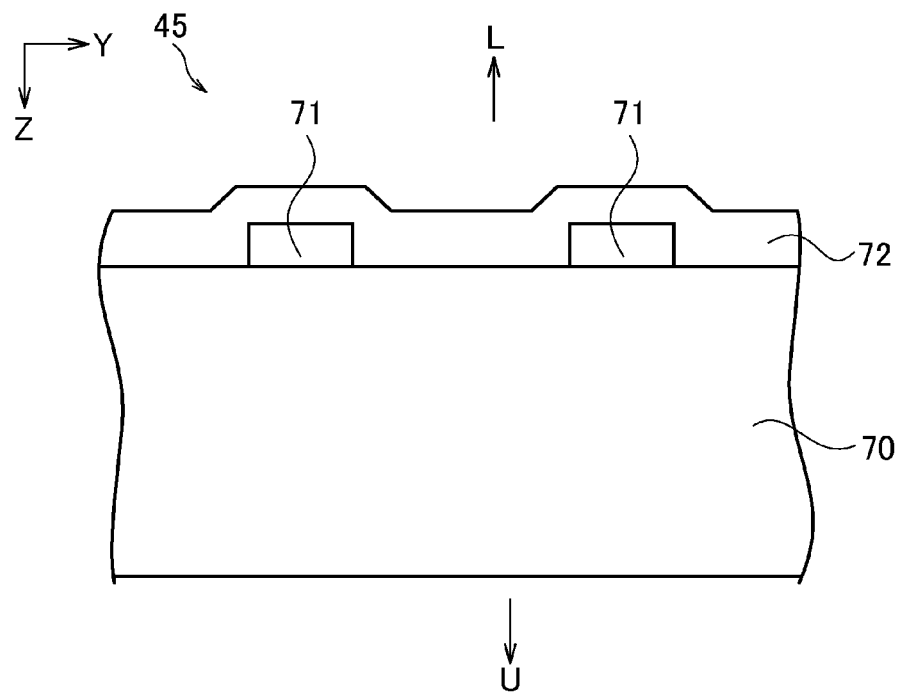
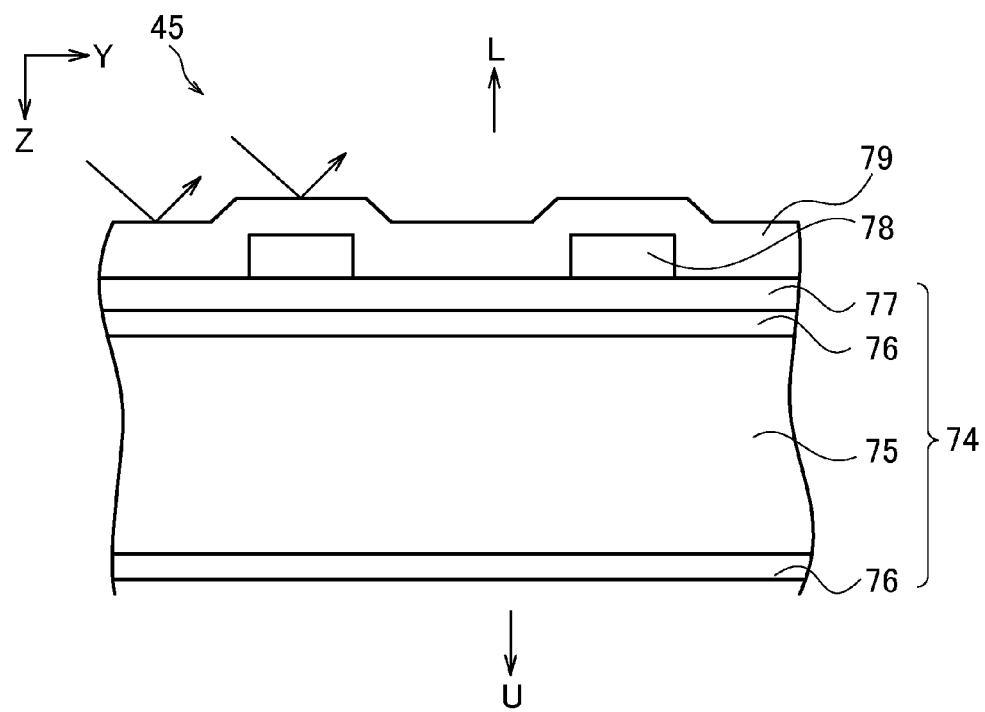

ILLUMINATION APPARATUS AND PAPER SHEET DISTINGUISHING APPARATUS

CROSS-REFERENCE TO RELATED APPLICATIONS

This application is based upon and claims the benefit of priority of the prior Japanese Patent Application No. 2014-045423, filed on Mar. 7, 2014, the entire contents of which are incorporated herein by reference.

BACKGROUND OF THE INVENTION

1. Field of the Invention

The present invention relates to an illumination apparatus and a paper sheet distinguishing apparatus that emit linear light to an object to be illuminated.

2. Description of the Related Art

An illumination apparatus that emits linear light to an object to be illuminated is known. A reading unit of an image reading apparatus disclosed in Patent Document 1 is provided with a light source, a printed board, and the like in a frame body. The reading unit includes an optical opening at a position facing a conveyance path of the frame body, and part of the light of the light source is emitted to an original through the optical opening.

Patent Document 1

Japanese Laid-open Patent Publication No. 2009-135914

The reading unit disclosed in Patent Document 1 includes a large number of constituent members, such as the light source, the printed board, and the optical opening, in the frame body, and there is a problem that the manufacturing cost is high.

SUMMARY OF THE INVENTION

The present invention has been made in view of the problem, and an object of the present invention is to reduce the manufacturing cost by reducing constituting members of an illumination apparatus that emits linear light to an object to be illuminated.

The present invention provides an illumination apparatus that emits linear light to an object to be illuminated, the illumination apparatus including: a light source that emits light; a light guide that is formed in a rod shape and that guides the light from the light source to the object to be illuminated; a housing that houses the light source and the light guide; and a circuit board including a conduction portion electrically connected to the light source, wherein the circuit board is provided with a slit in a longitudinal direction of the light guide, the slit is disposed closer to the object to be illuminated than the light guide, and the light from the light guide is emitted to the object to be illuminated through the slit.

The present invention provides a paper sheet distinguishing apparatus that distinguishes a paper sheet as an object to be illuminated, the paper sheet distinguishing apparatus including: an illumination apparatus that emits linear light to the object to be illuminated; an image sensor unit including: a light condenser that focuses light emitted by the illumination apparatus and transmitted through the paper sheet; and an image sensor that converts the light focused by the light condenser into an electric signal; a conveyance portion that conveys the paper sheet; a storage portion that stores reference data serving as a reference for distinguishing the paper sheet; and a storage portion that compares image data converted into the electric signal and the reference data stored in the storage portion to determine authenticity of the paper sheet, the illumination apparatus including: a light source that emits light; a light guide that is formed in a rod shape and that guides the light from the light source to the object to be illuminated; a housing that houses the light source and the light guide; and a circuit board including a conduction portion electrically connected to the light source, wherein the circuit board is provided with a slit in a longitudinal direction of the light guide, the slit is disposed closer to the object to be illuminated than the light guide, and the light from the light guide is emitted to the object to be illuminated through the slit.

BRIEF DESCRIPTION OF THE DRAWINGS

FIG. 5 is a sectional view showing a first internal configuration of the circuit board 45;

FIG. 6 is a sectional view showing a second internal configuration of the circuit board 45;

DETAILED DESCRIPTION OF THE PREFERRED EMBODIMENTS

Hereinafter, embodiments of the present invention will be described in detail with reference to the drawings. The embodiments provide an illumination apparatus and a paper sheet distinguishing apparatus 100 including the illumination apparatus. In the following description, three-dimensional directions will be indicated by arrows X, Y, and Z. The X direction denotes a main-scan direction, the Y direction denotes a sub-scan direction perpendicular to the main-scan direction, and the Z direction denotes a perpendicular direction (vertical direction).

In the embodiments, a light source unit 20 as an illumination apparatus and the paper sheet distinguishing apparatus 100 including the light source unit 20 will be described. The paper sheet distinguishing apparatus 100 determines the authenticity of paper sheets such as bills and securities. The light source unit 20 emits light for transmission reading to an original P (object to be illuminated) as a paper sheet.

Figure 2:
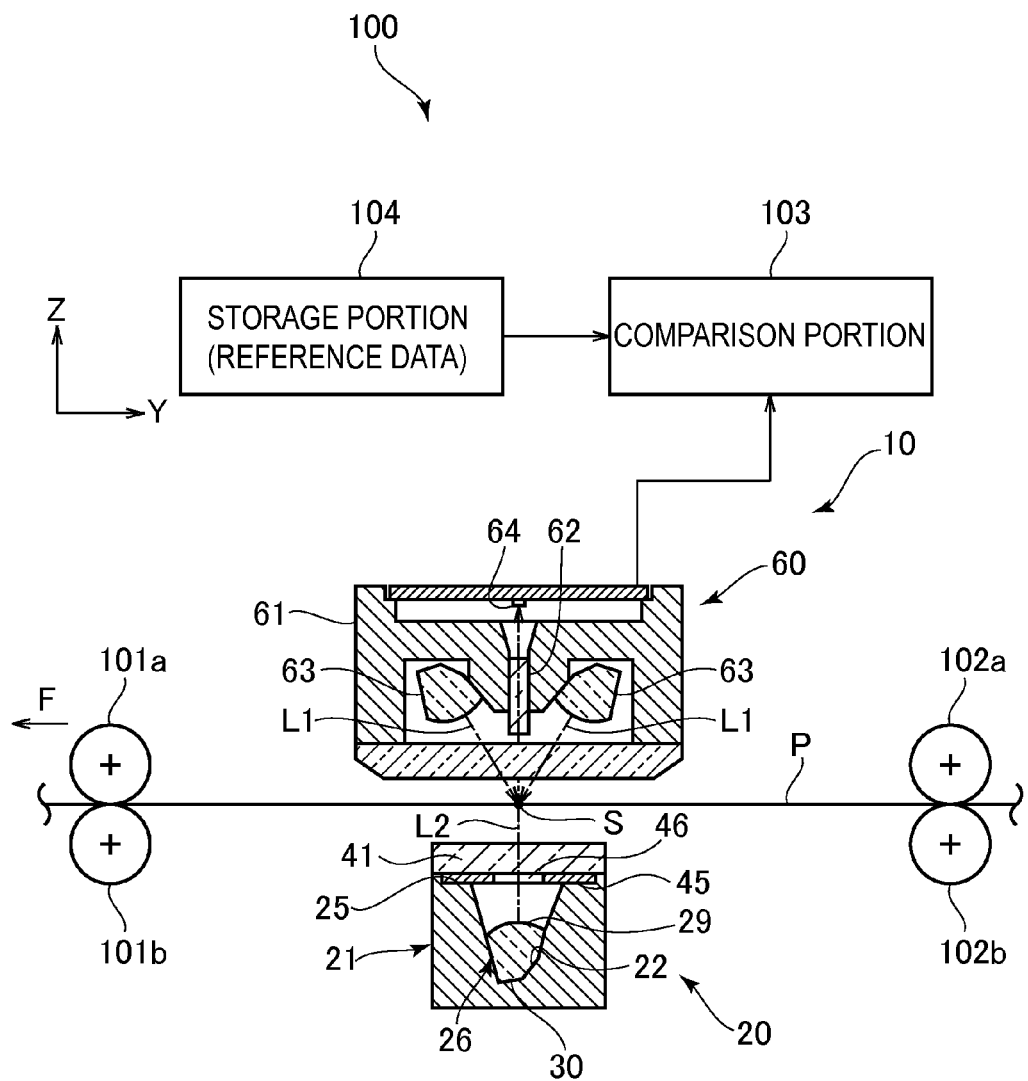
FIG. 2 is a sectional view showing a configuration of a paper sheet distinguishing apparatus 100.

FIG. 2 is a sectional view showing an example of a configuration of the paper sheet distinguishing apparatus 100. The paper sheet distinguishing apparatus 100 includes a paper sheet reading portion 10. At predetermined positions of the paper sheet reading portion 10, a pair of conveyor rollers 101*a* and 101*b* and a pair of conveyor rollers 102*a* and 102*b* as a conveyance portion for conveying the original P held therebetweeen are disposed at an interval in the sub-scan direction of the original P. A drive mechanism rotates and drives the conveyor rollers 101*a*, 101*b*, 102*a*, and 102*b*, and the original P is conveyed in a conveyance direction (arrow F direction shown in FIG. 2) at a predetermined conveyance speed.

The paper sheet reading portion 10 is disposed on a conveyance path of the original P between the pair of conveyor rollers 101a and 101b and the pair of conveyor rollers 102a and 102b and reads an image of the conveyed original P. Across the conveyance path, i.e. the original P, the paper sheet reading portion 10 of the embodiments includes the light source unit 20 disposed below and an image sensor unit 60 disposed above.

The light source unit 20 emits light for transmission reading to the original P from below.

The image sensor unit 60 emits light for reflection reading to the original P from above and reads reflected light from the original P as well as transmitted light of the light emitted by the light source unit 20 to the original P and transmitted through the original P.

A comparison portion 103 is an example of comparison means and acquires image data read by the image sensor unit 60. The comparison portion 103 reads reference data stored in a storage portion 104 and compares the reference data with the acquired image data to determine the authenticity of the original P.

The storage portion 104 is an example of storage means and stores reference data that serves as a reference for distinguishing the original P.

Basic operation of the light source unit 20 and the image sensor unit 60 will be described.

The conveyor rollers 101a, 101b, 102a, and 102b convey the original P in the conveyance direction at the predetermined conveyance speed. The image sensor unit 60 emits light for reflection reading indicated by arrows L1 to the upper surface of the original P from light guides 63 disposed across a light condenser 62 by causing a light source not shown disposed in a frame 61 to emit light. Therefore, the light is linearly emitted to the original P throughout a reading line S (main-scan direction). The original P reflects the light, and the reflected light is focused on an image sensor 64 through the light condenser 62. The image sensor 64 can convert the focused reflected light into an electric signal to read the image on the upper surface of the original P.

Light is emitted from a first light source 31 and a second light source 32 described later disposed in the frame 21 of the light source unit 20 to emit light for transmission reading indicated by an arrow L2 to the lower surface of the original P from a light guide 26. Therefore, the light is linearly emitted to the original P throughout the reading line S (main-scan direction). The light transmits through the original P, and the transmitted light is focused on the image sensor 64 through the light condenser 62 of the image sensor unit 60. The image sensor 64 can convert the focused transmitted light into an electric signal to read the image transmitted through the original P after the emission of the light from below the original P.

In this way, the image sensor 64 reads the reflected light and the transmitted light of one scan line, and the reading operation of one scan line in the main-scan direction of the original P is completed. After the end of the reading operation of one scan line, reading operation of the next scan line is performed in the same way as the operation described above, along with the movement of the original P in the sub-scan direction. In this way, the reading operation of one scan line is repeated while conveying the original P in the sub-scan direction. The entire surface of the original P is successively scanned, and the image is read based on the reflected light and the transmitted light.

First Embodiment

Figure 1:
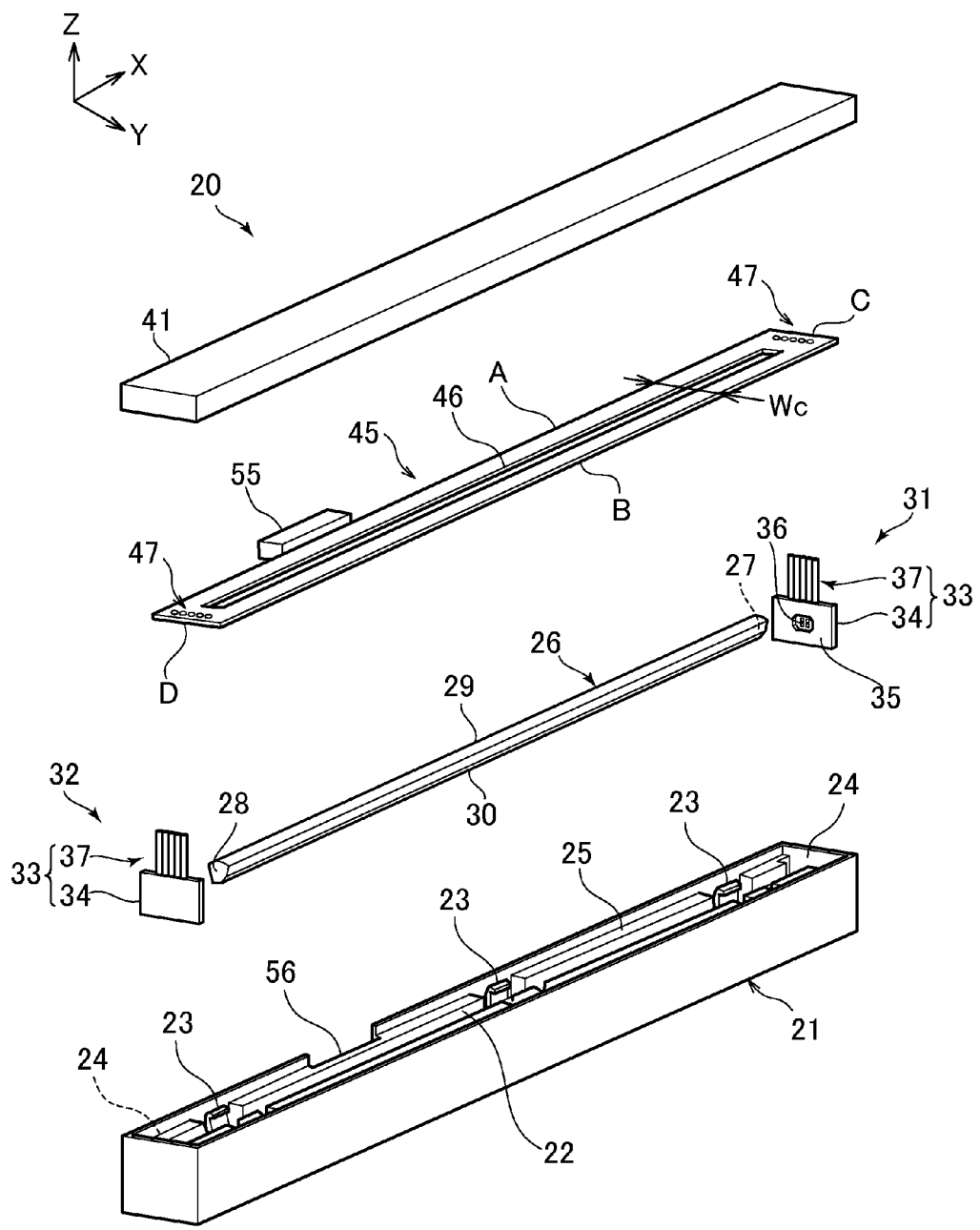
FIG. 1 is an exploded perspective view showing a configuration of a light source unit 20 of a first embodiment.
Figure 3:
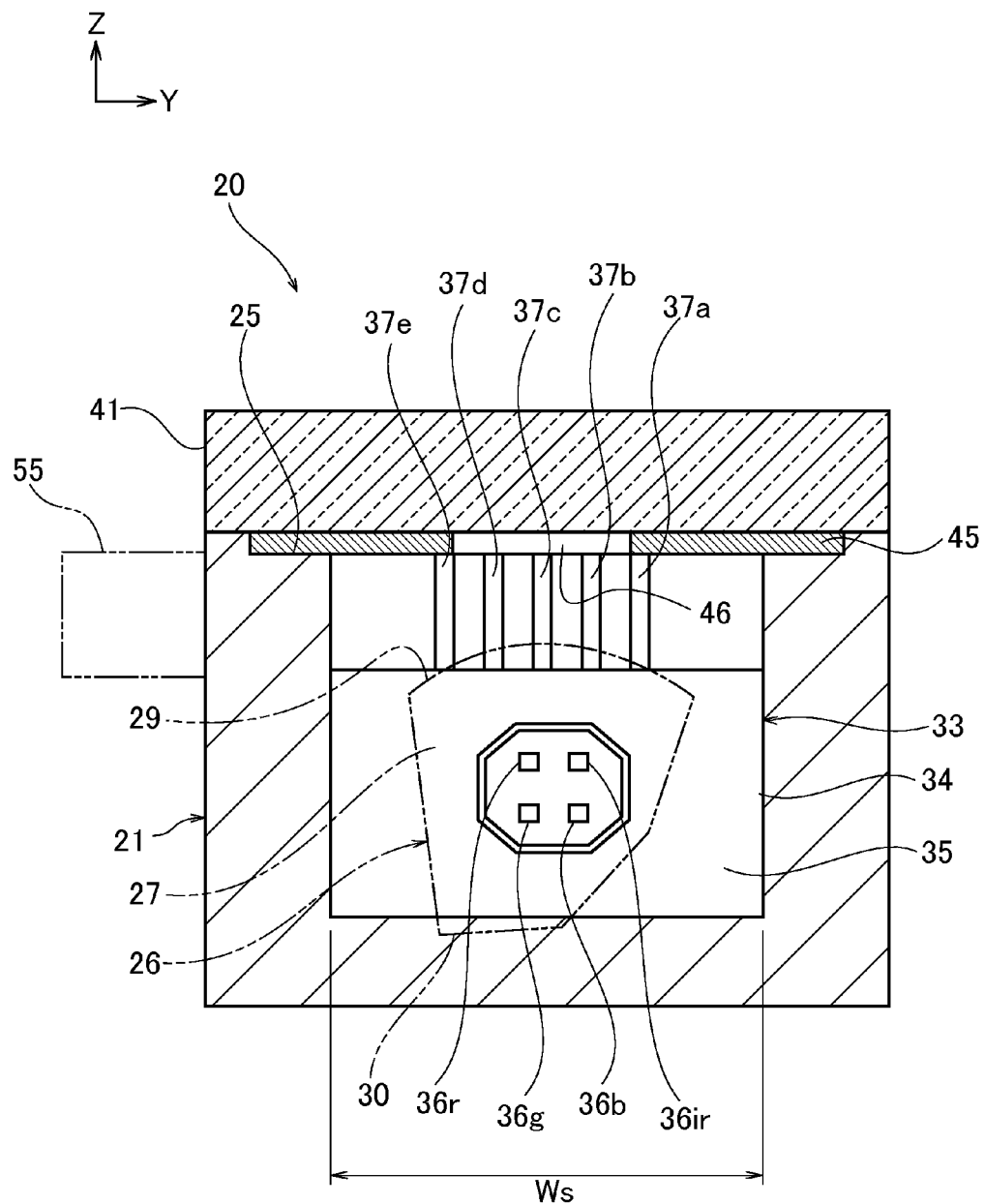
FIG. 3 is a sectional view of the light source unit 20 viewed from the side of a second light source 32.
Figure 4:
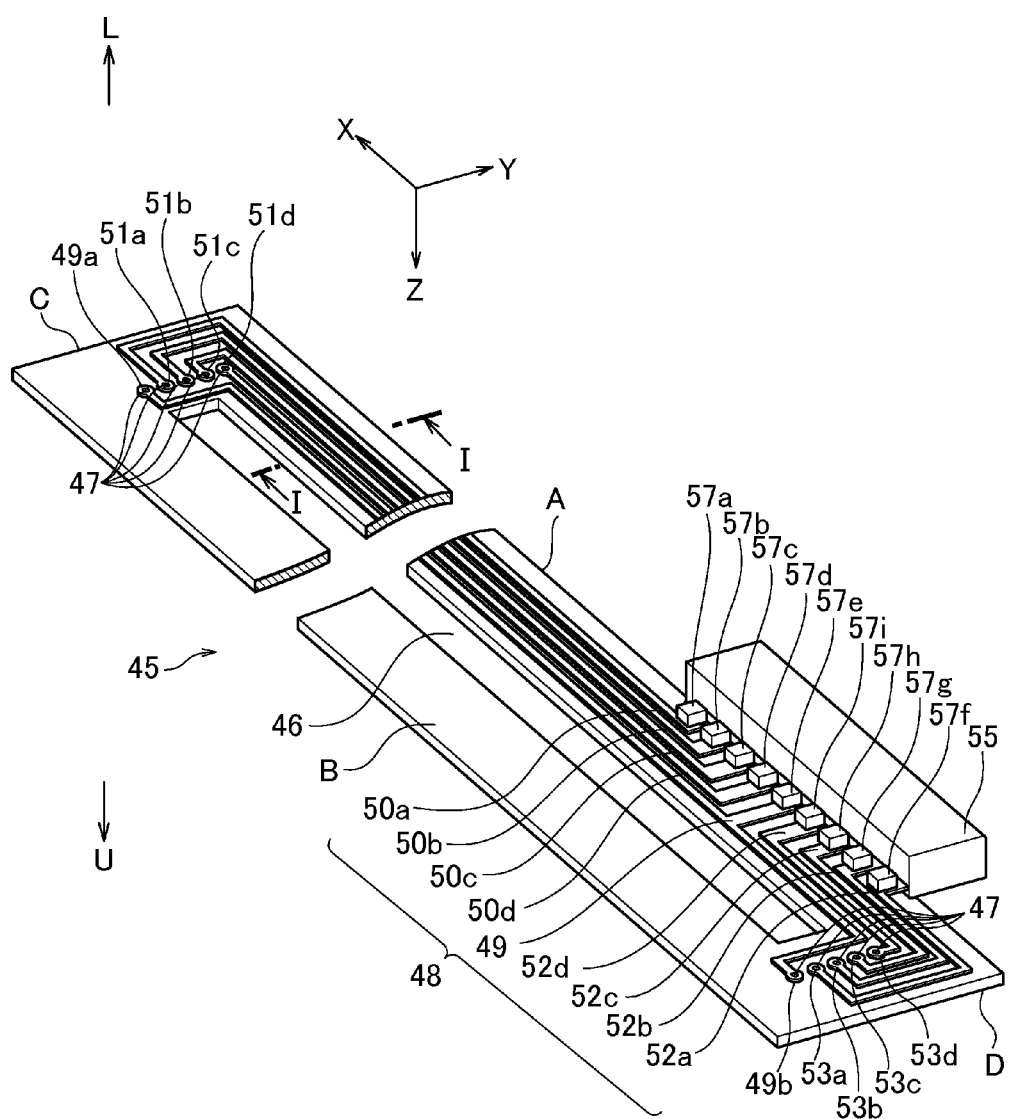
FIG. 4 is a perspective view of a circuit board 45 viewed from below.

A configuration of the light source unit 20 according to a first embodiment will be described with reference to FIGS. 1, 3, and 4. FIG. 1 is an exploded perspective view showing the configuration of the light source unit 20. FIG. 3 is a sectional view of the light source unit 20 viewed from the side of the second light source 32. FIG. 4 is a perspective view of a circuit board 45 viewed from below.

The light source unit 20 as a whole has an external appearance of a substantially rectangular solid, and the longitudinal direction is the main-scan direction.

As shown in FIG. 1, the light source unit 20 includes the frame 21, the light guide 26, the first light source 31, the second light source 32, a cover member 41, and the circuit board 45. Among the constituent members, the frame 21, the light guide 26, the cover member 41, and the circuit board 45 are formed in a length according to the dimension in the main-scan direction of the original P to be read.

The frame 21 is a housing of the light source unit 20 and houses the light guide 26, the first light source 31, the second light source 32, and the circuit board 45. The frame 21 of the present embodiment is a substantially rectangular solid with the main-scan direction as the longitudinal direction and is formed to open upward. A light guide housing portion 22 that houses the light guide 26 is formed inside of the frame 21, in the longitudinal direction of the frame 21. A plurality of snap-fit holding portions 23 are formed on the light guide housing portion 22, at intervals in the longitudinal direction. The holding portions 23 hold the light guide 26 in the light guide housing portion 22, and the light guide 26 is removable. Light source housing portions 24 that house the first light source 31 and the second light source 32 are formed on both ends of the frame 21 in the longitudinal direction. A board housing portion 25 that houses the circuit board 45 is formed above the light guide housing portion 22. A space formed in substantially the same thickness and width as those of the circuit board 45 (Wc shown in FIG. 1) is formed in the board housing portion 25. A cut-out portion 56 for fitting a connector 55 described later is formed on one of four sides of the frame 21 in the longitudinal direction.

The light guide 26 guides the light emitted by the first light source 31 and the second light source 32 to the original P and is formed in a rod shape with the main-scan direction as the longitudinal direction. The light guide 26 is formed by a transparent resin, such as an acrylic resin and polycarbonate. The light guide 26 is held in the light guide housing portion 22, parallel to the longitudinal direction of the frame 21.

One end face of both end faces of the light guide 26 in the main-scan direction is a first incident surface 27 that receives the light from the first light source 31, and the other end face is a second incident surface 28 that receives the light from the second light source 32. The light guide 26 is provided with an emission surface 29 that emits the light entering the light guide 26 toward the original P, on the surface facing the original P. The light guide 26 is provided with a diffusing surface 30 that reflects and diffuses the light entered from the first incident surface 27 and the second incident surface 28, on the surface facing the emission surface 29. A light diffusing pattern made of a light reflective paint based on, for example, silk screen printing is formed on the diffusing surface 30. The light entered from the first incident surface 27 and the second incident surface 28 is diffused by the light diffusing pattern and emitted from the emission surface 29 to the original P. The surfaces other than the emission surface 29 and the diffusing surface 30 function as reflection surfaces for reflecting the incident light.

The first light source 31 and the second light source 32 are light sources for emitting light for transmission reading to the original P. LED modules 33 with substantially the same shape and structure are used for the first light source 31 and the second light source 32. Specifically, the LED module 33 of the first light source 31 and the LED module 33 of the second light source 32 are line-symmetric with respect to a center line in the width direction (Ws in FIG. 3).

The LED module 33 includes a supporting body 34 formed in a substantially rectangular shape and a plurality of lead terminals 37 protruding from the supporting body 34. The supporting body 34 is provided with a flat light emitting surface 35, and LED chips 36 as light emitting elements sealed by a transparent resin are supported by the light emitting surface 35.

As shown in FIG. 3, LED chips 36r, 36g, 36b, and 36ir with red, green, blue, and infrared emission wavelengths are used for the LED chips in the LED module 33 of the present embodiment. The LED chip 36ir with infrared emission wavelength is used to read the original P applied with invisible ink for the security.

The LED module 33 of the present embodiment includes a common terminal 37a and independent terminals 37b to 37e as lead terminals. The common terminal 37a is electrically connected to all of the LED chips 36r, 36g, 36b, and 36ir in the supporting body 34. The independent terminals 37b to 37e are electrically connected to the LED chips 36r, 36g, 36b, and 36ir, respectively and independently, in the supporting body 34.

The type and the number of LED chips 36 can be changed according to the original P to be read or the like. For example, an LED chip with ultraviolet emission wavelength may be used in place of the LED chip with infrared emission wavelength, or an LED chip with ultraviolet emission wavelength may be added.

The LED module 33 of the first light source 31 and the LED module 33 of the second light source 32 may include a different combination of LED chips 36, instead of the same combination of LED chips 36. For example, the different combination of LED chips 36 includes: LED chips 36g and 36b with green and blue emission wavelengths disposed on the LED module 33 of the first light source 31; and LED chips 36r and 36ir with red and infrared emission wavelengths disposed on the LED module 33 of the second light source 32.

The cover member 41 prevents a slip of paper or a foreign matter from entering the frame 21. The cover member 41 is fixed on the upper end of the frame 21 by using, for example, a double-sided tape or an adhesive to cover the frame 21 from above, i.e. from the original P side. The cover member 41 is substantially planar with the main-scan direction as the longitudinal direction, and the cover member 41 is formed by a material, such as glass and an acrylic resin, through which the light emitted from the emission surface 29 of the light guide 26 is transmitted toward the original P.

The circuit board 45 includes a conduction portion 48 described later as a circuit pattern and electrically connects the LED module 33. The circuit board 45 is formed in a substantially sheet shape, and the main-scan direction is the longitudinal direction. The circuit board 45 of the present embodiment is disposed closer to the original P than the light guide 26, between the cover member 41 and the light guide 26. Specifically, the cover member 41 is fixed on the upper end of the frame 21 with the circuit board 45 housed in the board housing portion 25 of the frame 21, and the circuit board 45 is positioned between the frame 21 and the cover member 41.

The circuit board 45 of the present embodiment also functions as a light blocking member for reducing the constituent members. Specifically, the circuit board 45 is provided with a slit 46 in the main-scan direction, at the center in the width direction. The length of the slit 46 in the main-scan direction is longer than the dimension of the original P to be read in the main-scan direction. The slit 46 is formed to penetrate in the vertical direction, and the light emitted from the emission surface 29 of the light guide 26 is emitted to the original P through the slit 46. More specifically, light can be emitted from the light source unit 20 through the slit 46 to direct the light emitted from the light source unit 20 in a desired direction, toward the reading line S of the original P here. In other words, the circuit board 45 can block light in directions not to be emitted from the light source unit 20.

To facilitate the explanation, a part A of the circuit board 45 shown in FIG. 1 will be called one long end. A part B will be called the other long end. A part C will be called one short end. A part D will be called the other short end.

The circuit board 45 of the present embodiment is provided with a plurality of insertion holes 47 on the one short end and on the other short end. The lead terminals 37 of the LED modules 33 are inserted to the insertion holes 47 and bonded by soldering.

A connector 55 is coupled to the one long end in the circuit board 45. The connector 55 is used to connect a cable for supplying power to the LED chips 36 of the light source unit 20 from the image sensor unit 60, for example.

FIG. 4 is a perspective view of the circuit board 45 viewed from below. As shown in FIG. 4, the connector 55 coupled to the circuit board 45 includes a plurality of connection terminals 57a to 57i, and the connection terminals 57a to 57i are bonded to connection points of the conduction portion 48 formed on the other long end of the circuit board 45 and formed on the side closer to the light guide 26.

The conduction portion 48 includes: a common conduction portion 49; conduction portions 50a to 50d of a first group for electrically connecting the LED chips 36 of the first light source 31; and conduction portions 52a to 52d of a second group for electrically connecting the LED chips 36 of the second light source 32.

The common conduction portion 49 extends in the sub-scan direction toward the other long end from the connection point where the connection terminal 57e of the connector 55 is bonded and then extends toward the one short end and the other short end to form connection points 49a and 49b. The common terminal 37a of the LED module 33 of the first light source 31 is inserted to the insertion hole 47 formed at the center, and the connection point 49a is bonded with the common terminal 37a. Similarly, the common terminal 37a of the LED module 33 of the second light source 32 is inserted to the insertion hole 47 formed at the center, and the connection point 49b is bonded with the common terminal 37a.

The conduction portions 50a to 50d of the first group extend toward the one short end from the connection points where the connection terminals 57a to 57d of the connector 55 are bonded, and connection points 51a to 51d are formed. The connection points 49a and 51a to 51d formed on the one short end are disposed in a line in the sub-scan direction, and there are predetermined intervals between adjacent connection points. The independent terminals 37b to 37e of the LED module 33 of the first light source 31 are inserted to the insertion holes 47 formed at the centers, and the connection points 51a to 51d are bonded with the independent terminals 37b to 37e.

The conduction portions 52a to 52d of the second group extend toward the other short end from the connection points where the connection terminals 57f to 57i of the connector 55 are bonded, and connection points 53a to 53d are formed. The connection points 49b and 53a to 53d formed on the other short end are disposed in a line in the sub-scan direction, and there are predetermined intervals between adjacent connection points. The independent terminals 37b to 37e of the LED module 33 of the second light source 32 are inserted to the insertion holes 47 formed at the centers, and the connection points 53a to 53d are bonded with the independent terminals 37b to 37e.

Therefore, the power supplied from the connector 55 is supplied through the conduction portion 48 of the circuit board 45 to the LED modules 33 of the first light source 31 and the second light source 32 electrically connected to the conduction portion 48.

Internal configurations of the circuit board 45 will be described with reference to FIGS. 5 to 8. FIGS. 5 to 8 are parts of sectional views from arrow directions obtained by cutting a line I-I shown in FIG. 4 in the vertical direction. An arrow L side in the drawings is a side where the light guide 26 is disposed, and an arrow U side is a side where the cover member 41 is disposed.

(First Internal Configuration)

A first internal configuration is an example in which the circuit board 45 is a printed circuit board. FIG. 5 is a sectional view showing the first internal configuration of the circuit board 45.

The circuit board 45 is formed by laminating, from the U side, a planar glass epoxy resin 70 as a base material, metal lines 71 as conduction portions such as copper foils, and a solder resist 72 as a protective layer. The circuit board 45 can be a printed circuit board, and the manufacturing cost of the circuit board 45 can be reduced.

(Second Internal Configuration)

A second internal configuration is an example in which the circuit board 45 is a flexible board. FIG. 6 is a sectional view showing the second internal configuration of the circuit board 45.

The circuit board 45 is formed by laminating, from the U side, a base film 74 as a base material, metal lines 78 as conduction portions such as copper foils, and a solder resist 79. In the base film 74, protective films 76 are provided above and below a planar metal sheet 75, and an insulating adhesive 77 is formed. The metal lines 78 are laminated through the insulating adhesive 77. The solder resist 79 is laminated to cover the metal lines 78.

Metal, such as aluminum, an aluminum alloy (for example, A8021), and copper, can be used for the metal sheet 75. Specifically, it is suitable to use BESPA of Sumikei Aluminum Foil Co., Ltd. A polyamide-imide resin can be used for the protective films 76. A thermosetting adhesive can be used for the insulating adhesive 77. Specifically, it is suitable to use adhesives #8800 and #9300 of Toray Industries, Inc. A white diffusion coating or a white pigment can be used for the solder resist 79. It is preferable that the solder resist 79 can reflect the light emitted from the emission surface 29. Specifically, the white diffusion coating can include barium sulfate (BaSO4) to reflect light with any of ultraviolet, visible, and infrared emission wavelengths. The white pigment can include titanium oxide (TiO) to reflect light with visible and infrared emission wavelengths. The solder resist 79 can reflect the light emitted from the emission surface 29 to increase the amount of light emitted from the emission surface 29 as described later.

(Third Internal Configuration)

Figure 7:
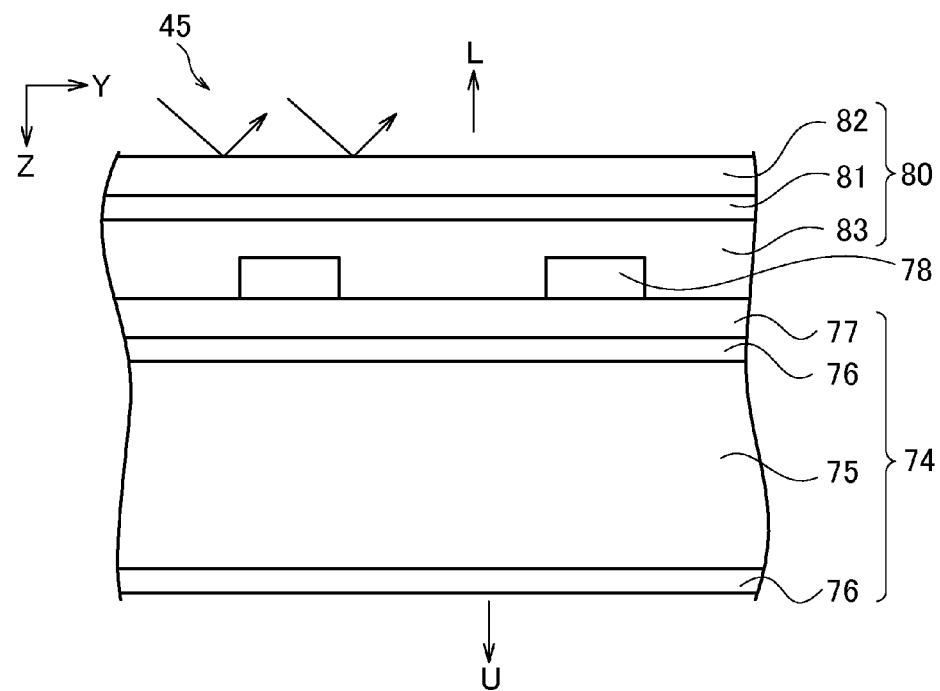
FIG. 7 is a sectional view showing a third internal configuration of the circuit board 45.

A third internal configuration is an example in which the circuit board 45 is a flexible board. FIG. 7 is a sectional view showing the third internal configuration of the circuit board 45.

The circuit board 45 is formed by laminating, from the U side, the base film 74 as a base material, the metal lines 78 as conduction portions such as copper foils, and a coverlay film 80. The configurations of the base film 74 and the metal lines 78 are the same as in the second internal configuration.

Meanwhile, a polyimide film 81 and a coat layer 82 are laminated in the coverlay film 80, and the coverlay film 80 is bonded to the base film 74 through an insulating adhesive 83.

It is suitable to use Apical NPI of Kaneka Corporation for the polyimide film 81. A white diffusing coating or a white pigment can be used for the coat layer 82. It is preferable that the coat layer 82 can reflect the light emitted from the emission surface 29. Specifically, the white diffusion coating can include barium sulfate (BaSO4) to reflect light with any of ultraviolet, visible, and infrared emission wavelengths. The white pigment can include titanium oxide (TiO) to reflect light with visible and infrared emission wavelengths. The coat layer 82 can reflect the light emitted from the emission surface 29 to increase the amount of light emitted from the emission surface 29 as described later. It is suitable to use a CM type of Arisawa Manufacturing Co., Ltd. for the insulating adhesive 83.

(Fourth Internal Configuration)

Figure 8:
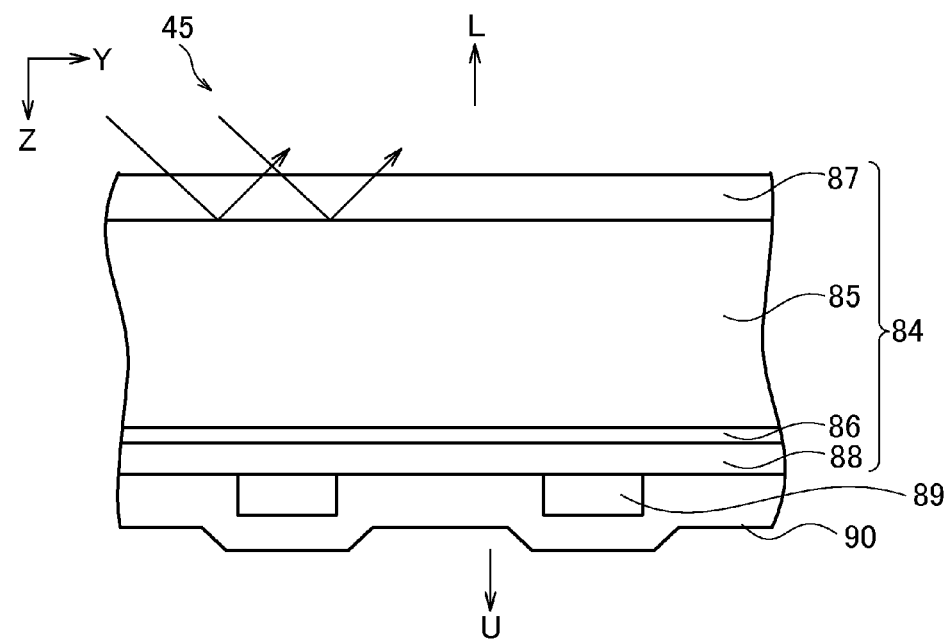
FIG. 8 is a sectional view showing a fourth internal configuration of the circuit board 45.

A fourth internal configuration is an example in which the circuit board 45 is a flexible board. FIG. 8 is a sectional view showing the fourth internal configuration of the circuit board 45.

The circuit board 45 is formed by laminating, from the L side, a base film 84 as a base material, metal lines 89 as conduction portions such as copper foils, and a solder resist 90. In the base film 84, a planar metal sheet 85 is placed between a protective film 86 on the U side and a permeable protective sheet 87 on the L side, and an insulating adhesive 88 is formed on the protective film 86 side. The metal lines 89 are laminated through the insulating adhesive 88. The solder resist 90 is laminated to cover the metal lines 89.

Metal, such as aluminum, an aluminum alloy (for example, A8021), and copper, can be used for the metal sheet 85. Specifically, it is suitable to use BESPA of Sumikei Aluminum Foil Co., Ltd. A polyamide-imide resin can be used for the protective films 86. A sheet that can transmit the light with emission wavelengths of the LED chips 36 is used for the permeable protective sheet 87. For example, a cyclo-olefin polymer resin can be used to transmit light with ultraviolet, visible, and infrared emission wavelengths. It is suitable to use a ZEONOR film of Zeon Corporation for the permeable protective sheet 87. Therefore, the light emitted from the emission surface 29 can be transmitted through the permeable protective sheet 87 and reflected by the metal sheet 85 to increase the amount of light emitted from the emission surface 29 as described later.

The circuit board 45 can be a flexible board as in the second to fourth internal configurations to reduce the thickness of the circuit board 45 and downsize the light source unit 20. Specifically, when the coverlay film 80 is included as in the third internal configuration, the thickness of the circuit board 45 can be 120 μnm to 240 μm, preferably, 120 μm to 170 μm. In the second and fourth internal configurations, the thickness of the circuit board 45 can be 80 μm to 200 μm, preferably, 80 μm to 130 μm.

A planar metal sheet can be used for part of the base film of the circuit board 45 to improve the rigidity of the circuit board 45 while maintaining the reduced thickness of the circuit board 45.

Aluminum or an aluminum alloy can reflect light with a wide range of emission wavelengths from ultraviolet to infrared. Therefore, aluminum or an aluminum alloy can be used for the metal sheet 85 in the fourth internal configuration to reflect light with a wide range of emission wavelengths.

An arrangement of the constituent members when the light source unit 20 is assembled will be described.

When the light source unit 20 is assembled, the first light source 31 and the second light source 32 are disposed on both end faces of the light guide 26 in the main-scan direction. Specifically, the light emitting surface 35 of the first light source 31 faces the first incident surface 27 of the light guide 26 at a predetermined interval, and the light emitting surface 35 of the second light source 32 faces the second incident surface 28 of the light guide 26 at a predetermined interval. In this case, as indicated by an alternate long and two short dashes line in FIG. 3, the frame 21 holds the light guide 26 at a position that the LED chips 36 fall within an area of the incident surface 27 as viewed from the main-scan direction.

The frame 21 holds the first light source 31 and the second light source 32 in a direction that the lead terminals 37 of the LED modules 33 protrude toward the cover member 41 from the supporting bodies 34.

The circuit board 45 is housed in the board housing portion 25 and positioned between the frame 21 and the cover member 41. Since the space in the board housing portion 25 is substantially the same size as the circuit board 45, the circuit board 45 is positioned at a predetermined position relative to the frame 21. The common terminal 37a and the independent terminals 37b to 37e of the LED module 33 of the first light source 31 are bonded to the connection points 49a and 51a to 51d of the circuit board 45, respectively, and the common terminal 37a and the independent terminals 37b to 37e of the LED module 33 of the second light source 32 are bonded to the connection points 49b and 53a to 53d, respectively.

When the frame 21 holds the circuit board 45, the slit 46 is positioned in the direction that the light is emitted from the emission surface 29 of the light guide 26, i.e. above the emission surface 29.

In the light source unit 20 with the configuration, the power for the light emission of the LED chips 36 is supplied through the conduction portion 48 of the circuit board 45. The LED chips 36r, 36g, 36b, and 36ir of the LED modules 33 of the first light source 31 and the second light source 32 sequentially emit light according to the power supplied through the conduction portion 48. The light from the LED chips 36r, 36g, 36b, and 36ir enters from the incident surfaces 27 and 28 of the light guide 26, and the light is emitted from the emission surface 29 toward the original P.

The slit 46 of the circuit board 45 is positioned in the direction of the emission of light from the emission surface 29. Therefore, the light emitted from the emission surface 29 is emitted to the original P through the slit 46. In this case, the emission of light from the light source unit 20 through the slit 46 can direct the light emitted from the light source unit 20 in a desired direction, i.e. the reading line S of the original P here. In other words, the circuit board 45 can block the light in directions not to be emitted from the light source unit 20.

The ambient light incident on the light source unit 20 may enter the light guide 26 to become stray light, and this may reduce the reading accuracy of the image. The circuit board 45 of the present embodiment can prevent the ambient light from entering the light guide 26. More specifically, the circuit board 45 can block the ambient light incident on the light source unit 20.

In this way, the circuit board 45 electrically connects the first light source 31 and the second light source 32 and also functions as a light blocking member that blocks part of the light. Therefore, an additional light blocking member is not necessary, and this can reduce the constituent members of the light source unit 20 and reduce the manufacturing cost.

In the circuit board 45, the light guide 26 side can be configured to reflect the light emitted from the emission surface 29 as described in the second to fourth internal configurations. In this case, the light blocked by the circuit board 45 can be reflected toward the light guide 26 side, and the light can enter the light guide 26 again. The light entering the light guide 26 is diffused inside and emitted from the emission surface 29. The light is emitted to the original P through the slit 46. Therefore, the amount of light emitted from the emission surface 29 can be increased.

The circuit board 45 is housed in the board housing portion 25 and positioned at a predetermined position relative to the frame 21. The light guide 26 is housed in the light guide housing portion 22 and positioned relative to the frame 21. Therefore, the circuit board 45 and the light guide 26 are positioned through the frame 21. Thus, the light emitted from the emission surface 29 of the light guide 26 and emitted to the original P through the slit 46 of the circuit board 45 can be accurately directed in a desired direction.

Second Embodiment

In a case described in a second embodiment, surface-mount LED modules 95 are used as light sources, and light source substrates 92 and 93 provided with the LED modules 95 are connected to the circuit board 45.

Figure 9:
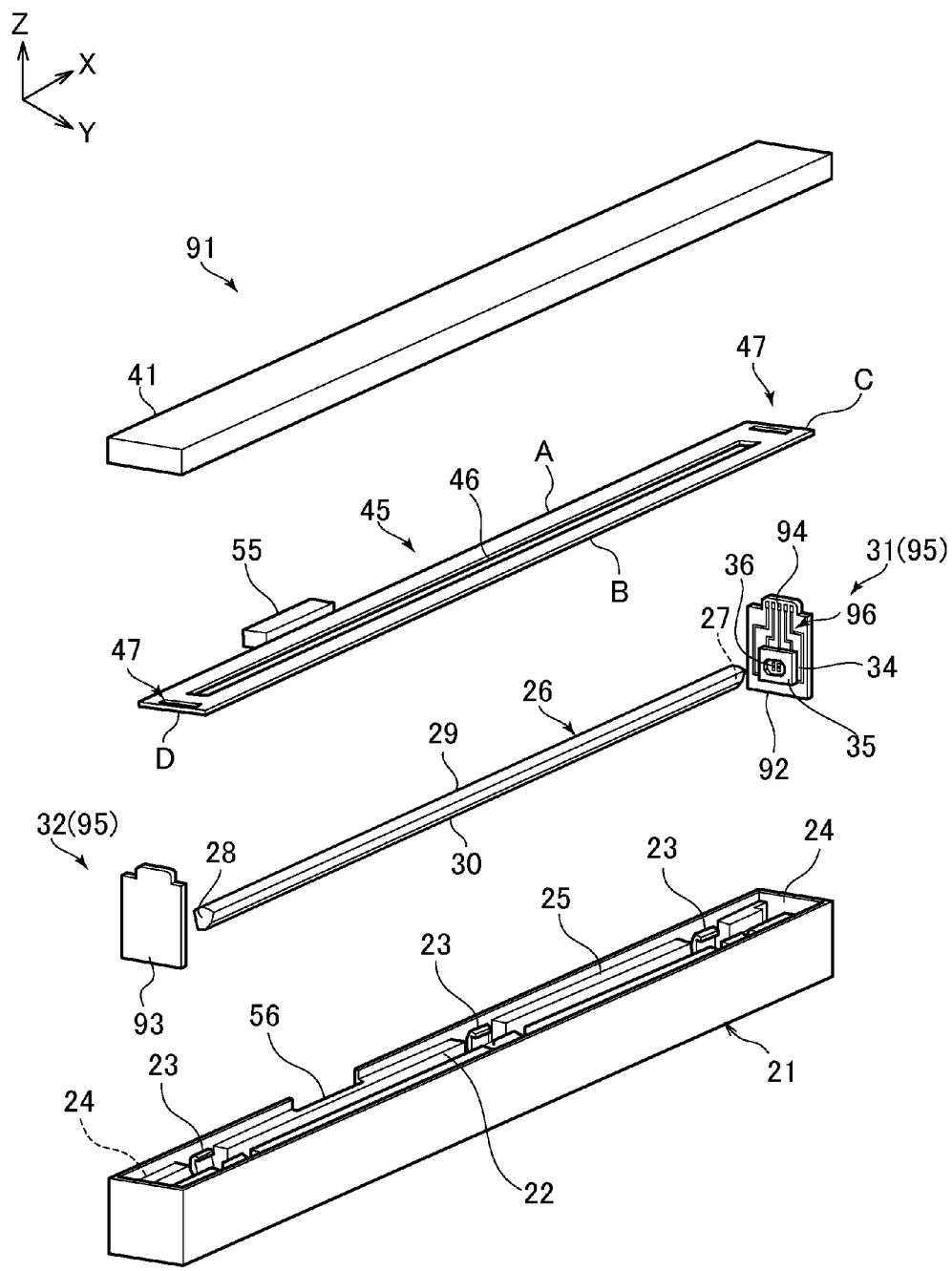
FIG. 9 is an exploded perspective view showing a configuration of a light source unit 91 of a second embodiment.

FIG. 9 is an exploded perspective view showing a configuration of a light source unit 91 according to the present embodiment. The same components as in the first embodiment are designated with the same reference numerals, and the description will not be repeated.

The light source unit 91 of the present embodiment includes a first light source substrate 92 and a second light source substrate 93 in addition to the circuit board 45. The printed circuit board illustrated in the first internal configuration can be used for the circuit board 45, the first light source substrate 92, and the second light source substrate 93 of the present embodiment.

The circuit board 45 of the present embodiment is provided with elongated insertion holes 47 in the sub-scan direction, on the one short end and the other short end. Sections provided with a plurality of pads 94 in the first light source substrate 92 and the second light source substrate 93 are inserted to the insertion holes 47 so that the first light source substrate 92 and the second light source substrate 93 are orthogonal to the circuit board 45. The pads 94 are bonded to the conduction portion 48 of the circuit board 45 by soldering.

The first light source substrate 92 is provided with the first light source 31 on the side facing the first incident surface 27 of the light guide 26, and the second light source substrate 93 is provided with the second light source 32 on the side facing the second incident surface 28 of the light guide 26. The surface-mount LED modules 95 are used for the first light source 31 and the second light source 32 of the present embodiment. The LED modules 95 are so-called top-view surface-mount LED modules including the LED chips 36 on the light emitting surface 35 and including a plurality of electrodes on the back side.

The first light source substrate 92 and the second light source substrate 93 are provided with conduction portions 96 as circuit patterns for electrically connecting the electrodes formed on the back side of the LED modules 95 to the pads 94. Therefore, the pads 94 are bonded to the conduction portion 48 of the circuit board 45, and the conduction portion 48 is electrically connected to the LED modules 95. The power supplied from the connector 55 is supplied to the LED modules 95 through the conduction portion 48 of the circuit board 45, the pads 94, and the conduction portions 96 of the light source substrates 92 and 93.

In this way, according to the present embodiment, relatively widely used surface-mount LED modules 95 can be used, and the manufacturing cost of the light source unit 91 can be reduced.

Third Embodiment

In a case described in a third embodiment, the surface-mount LED modules 95 are used as light sources. One short end and another short end of a circuit board 98 are bent, and the first light source 31 and the second light source 32 are mounted on the bent ends.

Figure 10:
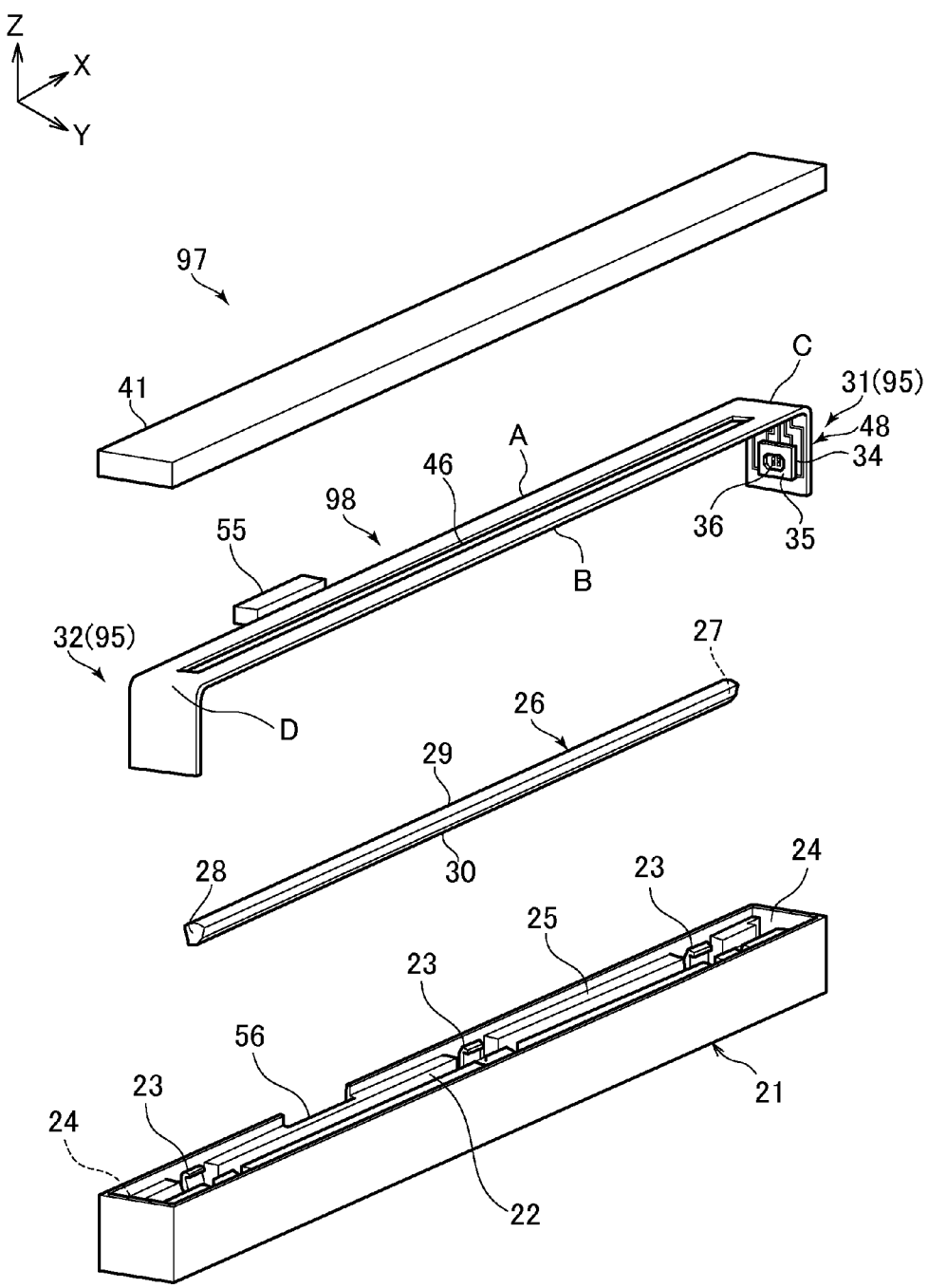
FIG. 10 is an exploded perspective view showing a configuration of a light source unit 97 of a third embodiment.

FIG. 10 is an exploded perspective view showing a configuration of a light source unit 97 according to the present embodiment. The same components as in the first and second embodiments are designated with the same reference numerals, and the description will not be repeated.

In place of the circuit board 45, the light source unit 97 of the present embodiment includes the circuit board 98 in which one short end and the other short end are bent 90 degrees, for example. The flexible boards illustrated in the second to fourth internal configurations can be used for the circuit board 98 in the present embodiment.

At the bent ends of the circuit board 98 of the present embodiment, the first light source 31 is mounted on the side facing the first incident surface 27 of the light guide 26, and the second light source 32 is mounted on the side facing the second incident surface 28 of the light guide 26. As in the second embodiment, the surface-mount LED modules 95 are used for the first light source 31 and the second light source 32 of the present embodiment.

The conduction portion 48 of the circuit board 98 is formed to extend also in the bent areas and is bonded by soldering to the electrodes formed on the back sides of the LED module 95 of the first light source 31 and the LED module 95 of the second light source 32. Therefore, the conduction portion 48 is electrically connected to the LED modules 95. The power supplied from the connector 55 is supplied to the LED modules 33 through the conduction portion 48 of the circuit board 98.

In this way, according to the present embodiment, relatively widely used surface-mount LED modules 95 can be used, and the manufacturing cost of the light source unit 97 can be reduced. An additional member, such as a light source substrate for mounting the first light source 31 and the second light source 32, is not necessary. Therefore, the constituent members of the light source unit 97 can be reduced, and the manufacturing cost can be reduced.

The circuit board 98 of the present embodiment is an example of a mode in which part of the circuit board 98 is disposed between the cover member 41 and the light guide 26. Specifically, part of the circuit board 98 excluding the bent ends is disposed between the cover member 41 and the light guide 26.

Although the preferred embodiments of the present invention have been described, the present invention is not limited to the embodiments. Various modifications and changes can be made within the scope of the present invention, and the embodiments may be appropriately combined.

Although the light source unit 20 is disposed below, and the image sensor unit 60 is disposed above across the original P in the embodiments, the light source unit 20 and the image sensor unit 60 may be switched around.

Another set of the combination of the light source unit 20 and the image sensor unit 60 may be disposed adjacently in the sub-scan direction. In this case, the adjacent light source unit 20 and image sensor unit 60 can be switched around to read images on the front and back surfaces of the original P in one conveyance.

Although the light sources 31 and 32 are installed on both end faces of the light guide 26 in the longitudinal direction in the embodiments, the arrangement is not limited to this, and the light source may be disposed only on one of the end faces of the light guide 26.

Although the light source unit 20 includes the cover member 41 in the embodiments, the arrangement is not limited to this, and the cover member 41 may be omitted.

According to the present invention, the manufacturing cost can be reduced by reducing the constituent members of the illumination apparatus that emits linear light to an object to be illuminated.

What is claimed is:

1. An illumination apparatus that emits linear light to an object to be illuminated, the illumination apparatus comprising:
   a light source that emits light;
   a light guide configured as a rod that guides the light from the light source to the object to be illuminated;
   a housing that houses the light source and the light guide; and
   a circuit board including:
      an electrical conduction portion electrically connected to the light source; and
      a slit extending in a longitudinal direction of the light guide, and
   disposed closer to the object to be illuminated than the light guide,
   wherein the light from the light guide is emitted to the object to be illuminated through the slit.

2. The illumination apparatus according to claim 1, wherein at least part of the electrical conduction portion is disposed closer to the object to be illuminated than the light guide.

3. The illumination apparatus according to claim 1, further comprising:
   a cover member that transmits the light emitted from the light guide to the object to be illuminated and that covers the housing from a side of the object to be illuminated,
   wherein the slit is disposed between the cover member and the light guide.

4. The illumination apparatus according to claim 3, wherein at least part of the electrical conduction portion is disposed between the cover member and the light guide.

5. The illumination apparatus according to claim 1, wherein:
   the light guide includes an incident surface for receiving the light from the light source and an emission surface for emitting the light received by the incident surface to the object to be illuminated, and
   the light source is electrically connected to the electrical conduction portion of the circuit board while facing the incident surface of the light guide.

6. The illumination apparatus according to claim 5, wherein the light source includes a plurality of lead terminals and is electrically connected to the electrical conduction portion of the circuit board through the plurality of lead terminals.

7. The illumination apparatus according to claim 5, further comprising:
a light source substrate on which the light source is mounted, the light source substrate connected to the circuit board,
wherein the light source is electrically connected to the electrical conduction portion of the circuit board through the light source substrate.

8. The illumination apparatus according to claim 1, wherein:
the light guide includes an incident surface for receiving the light from the light source and an emission surface for emitting the light received by the incident surface to the object to be illuminated, and
the circuit board is a flexible board and has a bent portion on which the light source is mounted so that the light source faces the incident surface of the light guide.

9. The illumination apparatus according to claim 1, wherein:
the circuit board includes a base material and the electrical conduction portion, and
the base material includes a planar metal sheet.

10. The illumination apparatus according to claim 9, wherein the metal sheet is aluminum or an aluminum alloy.

11. The illumination apparatus according to claim 1, wherein light for transmission reading is emitted to the object to be illuminated, and the light transmitted through the object to be illuminated is focused on an image sensor of an image sensor unit disposed across the object to be illuminated.

12. A paper sheet distinguishing apparatus that distinguishes a paper sheet as an object to be illuminated, the paper sheet distinguishing apparatus comprising:
an illumination apparatus that emits linear light to the object to be illuminated;
an image sensor unit comprising:
a light condenser that focuses light emitted by the illumination apparatus and transmitted through the paper sheet; and
an image sensor that converts the light focused by the light condenser into an electric signal;
a conveyance portion that conveys the paper sheet;
a storage portion that stores reference data serving as a reference for distinguishing the paper sheet; and
a storage portion that compares image data converted into the electric signal and the reference data stored in the storage portion to determine authenticity of the paper sheet,
wherein the illumination apparatus comprises:
a light source that emits light;
a light guide configured as a rod that guides the light from the light source to the object to be illuminated;
a housing that houses the light source and the light guide; and
a circuit board including:
an electrical conduction portion electrically connected to the light source; and
a slit extending in a longitudinal direction of the light guide, and
disposed closer to the object to be illuminated than the light guide,
wherein the light from the light guide is emitted to the object to be illuminated through the slit.

* * * * *